Patented May 26, 1925.

1,539,517

UNITED STATES PATENT OFFICE.

OTTO SCHMIDT, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

PROCESS FOR TANNING.

No Drawing.   Application filed August 27, 1921. Serial No. 495,955.

*To all whom it may concern:*

Be it known that I, OTTO SCHMIDT, citizen of Germany, residing at Ludwigshafen-on-the-Rhine, Germany, have invented new and useful Improvements in Processes for Tanning (for which I have filed applications in Germany on May 20th and 21st, 1920, and October 11th, 1920), of which the following is a specification.

I have found that a valuable leather is obtained if animal hides, or skins, are treated with the condensation products more or less soluble in water, that are obtained from ketones, oxy-ketones, or oxy-aldehydes, including waste sulfite liquor which contains as its chief constituent, lignin sulfonic acid and which may still have its sugar contents or be deprived thereof, and including other conversion products of wood, on the one hand, and polyvalent aromatic hydroxy compounds, containing no sulfonic acid groups, on the other. Such condensation products of the kind described, as are comparatively difficultly soluble in water, may be dissolved, for instance, in aqueous solutions of simple organic sulfonic acids, such as toluene sulfonic acid, or salts thereof and the solutions thus obtained can then be employed for tanning purposes.

According to my invention all the aforementioned condensation products, and generally speaking all condensation products of aldehydes, or ketones, and aromatic oxy compounds, which contain no sulfonic acid groups, are also eminently adapted for tanning animal hides, if they be employed in conjunction with artificial tanning substances for example sulfonated condensation products of hydrocarbons, or phenolic bodies, and formaldehyde, or other aromatic sulfonic acids capable of precipitating glue solutions, preferably high molecular sulfonic acids of such character, sulfonated crude anthracene and the like.

Tanning, with the substances mentioned, may be carried out in the usual manner. A solution is made of the said condensations products, in water, either alone or with an addition of an aromatic sulfonic acid, in case the condensation product is not soluble by itself, or with an addition of an organic synthetic tanning material, the solution having neutral or weakly acid character and the hides are placed into this solution and treated in the usual vats or drums until they are thoroughly tanned. The usual auxiliary compounds, salts and the like, may also be added.

In nearly all cases a fine strong leather is obtained, which excels by softness, pliability, great fulness and good color.

In order to further illustrate the nature of my invention and the manner of how it is carried into effect, reference is made to the following examples, but the invention is not limited thereto. The parts are by weight.

*Example 1.*

A small quantity of concentrated hydrochloric acid (of 1.16 specific gravity) is added, drop by drop, to a solution of 110 parts resorcinol in 56 parts of acetone (in the proportion of 3 or 4 drops of the acid for every 110 grams of resorcinol). Then allow to stand at from 10 degrees to 15 degrees centigrade, while shaking and cooling, if necessary, until a test portion is rendered dull, when diluted with water. Then add a little water, neutralize with chalk and extract the condensation product formed by means of ether. Dry the ether solution and evaporate the ether carefully. The tanning compound remaining as a residue represents a syrupy mass, freely soluble in water; its aqueous solution can at once serve for tanning, producing a fine, soft and pliable leather. Instead of acetone or resorcinol other ketones, or other polyvalent phenols may be employed in an analogous manner. In the absence of a condensing agent, the production of the tanning compound proceeds considerably less rapidly and completely.

*Example 2.*

Dissolve 126 parts of pyrogallol in 56 parts of acetone and 30 parts of water, then add 2 parts, by volume, of concentrated hydrochloric acid and heat on the water-bath until a test portion just gives a dull solution with water. Then dilute with water, neutralize with calcium carbonate, filter, extract with ether, dry the ether solution and evaporate the ether carefully. The syrupy residue can directly be employed for tanning. It produces a fine, full leather of the color of leather produced with oakwood extract.

Example 3.

Heat for 8 hours, in a bath of common salt brine, 110 parts of resorcinol with 120 parts of levulinic acid, 100 parts of water and 40 parts, by volume, of caustic soda lye of 40 degrees Baumé. Then add 20 more parts, by volume, of the caustic soda lye and heat for 16 more hours. Allow to cool, and use the solution, in a slightly acid condition, for tanning. An excellent leather is obtained with a smooth grain and a strong yet soft touch, good fulness and pleasant color.

Example 4.

Dissolve 110 parts of resorcinol in 100 parts of water, add thereto a mixture of 66 parts of aldol, 100 parts of water and 1 part of standard sulfuric acid, boil the solution for 2 hours under a reflux cooler. A limpid solution is obtained that remains clear on diluting with water and precipitates glue or gelatine solution. It is directly suitable for tanning and transforms animal hides into an almost colorless, full, soft leather.

Example 5.

Dissolve 110 parts of resorcinol in 100 parts of water, add thereto a mixture of 88 parts of aldol, 100 parts of water and 1 part of standard sulfuric acid; boil the solution under a reflux cooler for an hour and a half. A limpid liquid is obtained which becomes dull on diluting with water; however the turbidity disappears on adding a solution of a simple aromatic sulfonic acid, or a salt thereof, such as toluene-sodium-sulfonate; both the dull solution and that rendered clear by the addition of the sulfonate can be employed for tanning. An almost colorless, soft, full leather is obtained in this instance as well.

Example 6.

Dissolve 126 parts of pyrogallol in 100 parts of water and add thereto 88 parts of aldol, dissolved in 100 parts of water, and 1 part of standard sulfuric acid. Heat for an hour and a half under a reflux cooler and allow to cool. The solution may be used for tanning, after suitable dilution.

Example 7.

Dissolve 110 parts of resorcinol (1 molecule) in 100 parts of water and add thereto a solution of 150 parts (⅚ molecule) of grape sugar in 50 parts of water. Heat the mixture to about 100 degrees centigrade, after adding 5 parts of concentrated hydrochloric acid, until a test portion is getting thick on cooling. The product is a thick, brown syrup, which is soluble in water and can serve as a tanning agent after partial neutralization.

Example 8.

110 parts of resorcinol (1 molecule) are dissolved in 400 parts of water, mixed with 61 parts of salicylic aldehyde (½ molecule) and 6 parts, by volume, of standard sodium hydroxid solution, and heated, while stirring, to water-bath temperature, for 20 hours. A limpid, yellowish-red solution of neutral reaction is produced, which is capable of strongly precipitating glue solution, which remains clear on diluting with water and can directly serve for tanning. It converts animal hides into a fine light-yellow, soft leather of great fulness and pliability.

Instead of the oxy-aldehydes mentioned, oxy-ketones can be used, such as fruit sugar, and other condensing agents may be used as well.

Example 9.

Heat for 12 hours, on the water-bath a mixture of 66 parts of resorcinol, 54 parts of levulose, 108 parts, by volume, of caustic soda lye of 40 degrees Baumé and 42 parts, by volume, of water. Then dilute the whole with one time and a half its quantity of water and neutralize with sulfuric acid. A clear liquid is obtained, which strongly precipitates glue, or gelatine, solution and which is precipitated by mineral, but not by acetic, acid. It converts animal hides into a very fine, full leather of good touch like that obtained with the aid of quebracho extract.

In an analogous manner tanning substances may be employed which are derived from other oxy-aldehydes or oxy-ketones or other polyvalent aromatic hydroxy compounds, including those of the naphthalene series. Instead of starting from the oxy-aldehydes, or oxy-ketones themselves, substances may be used which are readily transformed into oxy-aldehydes or oxy-ketones, such for example as starch, dextrine, cellulose, or the like. For example, excellent tanning materials are obtained by treating starch solution with resorcinol or with dilute acids. Or starch, cellulose, or the like, may be first converted into sugar and the sugar solutions then condensed, in the manner described, with polyvalent aromatic oxy-compounds. Mixtures containing oxy-aldehydes, or oxy-ketones, may also be employed, such as ordinary waste sulfite liquors.

Example 10.

Add to a solution of 55 parts of resorcinol dissolved in 200 parts of water, 300 parts of evaporated waste sulfite liquor and 11.5 parts of concentrated hydrochloric acid and boil for 6 hours. When cool, the solution is at once ready for tanning and produces a nearly colorless leather of good touch. The tanning substance obtained may also be advantageously used in combinations with other tanning materials, such as oak-wood extract.

Waste sulfite liquors, wholly or partially deprived of sugars, may be used as well.

Example 11.

200 parts of evaporated waste sulfite liquor containing 27.6 per cent dry matter, deprived of sugar and substantially containing lignin sulfonic acid, are boiled, for 6 hours, with 15 parts of resorcinol, 281 parts of water and 9.4 parts, by volume, of concentrated hydrochloric acid. Allow to cool, neutralize partially, if desired, and employ the solution for tanning, in a diluted condition. A full leather is obtained excelling leather produced with waste sulfite liquor alone.

Example 12.

100 parts of strongly evaporated and purified waste sulfite liquor are boiled for 6 hours, under a reflux cooler, with 16.5 parts of resorcinol, 50 parts, by volume, of water and 7 parts, by volume, of concentrated hydrochloric acid; allow to cool, neutralize the hydrochloric acid and employ for tanning. A full, soft leather of good stand is obtained which far excels leather obtained with waste sulfite lye alone.

In the above examples 11 and 12 other polyvalent phenols, or naphthols, may be combined with waste sulfite liquor, instead of resorcinol. Good results are obtained, for example, by causing 2.7-di-hydroxy-naphthalene to react on waste sulfite liquor in the presence of caustic alkali and acidulating the alkaline solution of the condensation product. Other conversion products of wood may also be used.

Example 13.

10 parts of a condensation product, obtained by boiling, for a short time, equal molecular proportions of aldol and resorcinol in an aqueous solution containing a very small addition of sulfuric acid (which condensation product represents a colorless syrupy substance, readily soluble in water) are dissolved in water with an addition of the artificial tan obtained according to Patent 1,237,405. The mixture can serve for tanning in the usual manner, a reddish-white, soft, full leather of good touch and excellent yield being produced.

Other soluble aldol-resorcinol-products, e. g. that formed from 0.8 molecular proportion of aldol and 1 molecular proportion of resorcinol, or products derived from the condensation product of formaldehyde and acetaldehyde instead of from aldol, may be used in an analogous manner.

Example 14.

10 parts of a condensation product of acetaldehyde and resorcinol (obtained by allowing 110 parts of resorcinol, 250 parts of water, 5 parts of sulfuric acid of 25 per cent and 22 parts of acetaldehyde to stand, at room temperature, for about 24 hours and extracting with ether) are dissolved in water by means of 40 parts of the artificial tanning compound as obtained according to Example 1 of Patent 1,336,759; the solution can be used for tanning in the usual manner.

Example 15.

Heat equal parts of resorcinol and grape sugar in the presence of a little hydrochloric acid to 100 degrees centigrade. Dissolve 5 parts of the product thereby obtained (amorphous, reddish-brown, water-soluble substance) in water by means of 45 parts of the artificial tanning material as obtained according to Example 1 of Patent 1,336,759; use the solution for tanning.

Condensation products derived from other carbohydrates (levulose, dextrine, starch, cellulose) or other aromatic oxy-compounds may also be used.

Example 16.

10 parts of a product obtained by condensing equal weights of acetone and resorcinol in the presence of a small quantity of sulfuric acid of 25 per cent (which product is a water-soluble syrup) are dissolved in water with an addition of 90 parts the tanning product obtained according to Patent 1,237,405; tan with the solution in the usual way. A soft, full leather of a surface and a cut color resembling that produced with sulfited quebracho extract is obtained.

Example 17.

Dissolve in water 57 parts of the artificial tanning material obtained according to the pending application for Patent Serial Number 395,127 and 3 parts of para-cresol-dialcohol and use the solution for tanning.

Example 18.

6 parts of a condensation product obtained by boiling, for a longer time, of an aqueous solution of equal molecular proportions of aldol and resorcinol in the presence of some sulfuric acid—which product is a colorless, resinlike mass, for the most part insoluble in water—are dissolved in very dilute caustic soda solution, then gradually mixed with dilute sulfuric acid until the solution has a slightly acid reaction.

The finely divided precipitate is dissolved by adding 24 parts of the artificial tanning material obtained as described in Patent 1,237,405. The solution, when used for tanning in the usual manner, yields a beautiful leather of very good fullness.

*Example 19.*

1.5 parts of a concentrated solution of the tanning compound, obtained by condensing, under mild conditions, 0.5 molecular proportion of formaldehyde and 1 molecular proportion of resorcinol in an aqueous solution, are dissolved in water with an addition of 13.5 parts of the artificial tanning material obtained according to the pending application for Patent Serial Number 395,-127. Tan with the solution in the usual manner. A fine, soft, full leather is obtained.

Instead of the artificial tanning materials mentioned, others can be employed, for example, waste sulfite lye, or extract.

Introduce into a slightly diluted sulfonation mixture obtained from crude anthracene and sulfuric acid, while stirring and at a temperature of about from 90 to 100 degrees centigrade and in the course of about an hour, so much of alkali-soluble phenol-formaldehyde condensation product as is taken up by the mixture, which is about one-fifth the quantity, by weight, of the sulfonation mixture, and continue stirring for about an additional hour at the said temperature. Then dilute with hot water, remove a small amount of undissolved matter by filtration, neutralize with caustic soda lye and evaporate to dryness. Sodium sulfate when precipitated during evaporation may be removed. The sodium salt can be used for tanning in a dilute aqueous solution, slightly acidulated by means of sulfuric acid, producing a full leather of light brown color and a uniform grain and good body.

Strongly evaporated waste sulfite liquor of about 74 per cent content of solids (400 parts) may also be used for dissolving the said phenol-formaldehyde product (50 to 90 parts) with a similar result.

I claim:—

1. The process of tanning animal hides which consists in treating the hides with an aqueous solution of a condensation product derived from a carbonyl compound other than a carboxylic acid and an unsulfonated aromatic hydroxyl compound.

2. The process of tanning animal hides which consists in treating the hides with an aqueous solution containing a condensation product derived from a carbonyl compound other than a carboxylic acid and an unsulfonated aromatic hydroxyl compound and also containing an aromatic sulfonic acid.

3. The process of tanning animal hides which consists in treating the hides with an aqueous solution containing a condensation product derived from a carbonyl compound other than a carboxylic acid and an unsulfonated aromatic hydroxyl compound and also containing an organic artificial tanning material.

4. The process of tanning animal hides which consists in treating the hides with an aqueous solution containing a condensation product derived from a carbonyl compound other than a carboxylic acid and an unsulfonated aromatic hydroxyl compound and also containing an artificial tanning material containing sulfonic acid groups.

5. As a composition of matter a tanning preparation containing an organic sulfonic acid capable of tanning hides and of precipitating glue from its aqueous solution, and a condensation product derived from a carbonyl compound other than a carboxylic acid, and an unsulfonated phenolic body "in a water-soluble condition."

In testimony whereof I have hereunto set my hand.

OTTO SCHMIDT.